(12) United States Patent
Meldahl (10) Patent No.: US 7,660,188 B2
(45) Date of Patent: Feb. 9, 2010

(54) SEISMIC EXPLORATION AND IMAGING SYSTEM FOR PRODUCING SURVEY REPORTS OF SUBSEA GEOLOGICAL STRUCTURES

(75) Inventor: Paul Meldahl, Forus (NO)

(73) Assignee: Statoil ASA, Stavanger (NO)

( * ) Notice: Subject to any disclaimer, the term of this patent is extended or adjusted under 35 U.S.C. 154(b) by 42 days.

(21) Appl. No.: 10/519,882

(22) PCT Filed: Jun. 30, 2003

(86) PCT No.: PCT/GB03/02823

§ 371 (c)(1),
(2), (4) Date: Aug. 4, 2005

(87) PCT Pub. No.: WO2004/003589

PCT Pub. Date: Jan. 8, 2004

(65) Prior Publication Data

US 2006/0126433 A1   Jun. 15, 2006

(30) Foreign Application Priority Data

Jul. 1, 2002   (GB) ................. 0215214.8

(51) Int. Cl.
*G01V 1/38* (2006.01)
(52) U.S. Cl. ............... 367/14; 367/15; 367/149; 356/302
(58) Field of Classification Search ............ 367/14, 367/15, 149; 356/28, 28.5, 486, 614, 302
See application file for complete search history.

(56) References Cited

U.S. PATENT DOCUMENTS 4,576,479 A * 3/1986 Downs ............... 356/495
4,583,095 A * 4/1986 Peterson ............ 342/22
4,843,597 A   6/1989 Gjessing et al.
5,029,023 A * 7/1991 Bearden et al. ...... 356/614

(Continued)

FOREIGN PATENT DOCUMENTS

DE   40 04 228 A1   8/1991

(Continued)

OTHER PUBLICATIONS

Berni, "Remote sensing of seismic vibrations by laser Doppler interferometry," Geophysics, vol. 59, No. 12, pp. 1856-1867, Dec. 1994.

*Primary Examiner*—Scott A Hughes
(74) *Attorney, Agent, or Firm*—Patterson, Thuente, Skaar & Christensen, P.A.

(57) ABSTRACT

The present invention provides a seismic exploration and imaging system for producing seismic survey reports of subsea geological structures. The exploration system provides a method in which both P-waves and S-waves are detected without the need for placing detection apparatus in contact the seabed. A seismic event is applied (12) to the earth's surface (13), and the detected response including P-waves and S-waves in the earth's. The detecting apparatus comprises a means for monitoring and recording the response to the seismic event in the form of movements of particles at the earth's surface, from a position spaced from the earth's surface. Particles at the surface will respond both to P-wave and S-wave stimulation and so their movements will be representative of the two waves. These movements are detected from a distance.

31 Claims, 3 Drawing Sheets

U.S. PATENT DOCUMENTS

| | | | |
|---|---|---|---|
| 5,070,483 A | | 12/1991 | Berni |
| 5,109,362 A | * | 4/1992 | Berni .......................... 367/14 |
| 5,159,406 A | * | 10/1992 | Adler et al. ................. 356/486 |
| 5,477,324 A | | 12/1995 | Berthelot et al. |
| 6,134,966 A | | 10/2000 | Donskoy et al. |
| 6,141,440 A | * | 10/2000 | Melen ........................ 382/154 |

FOREIGN PATENT DOCUMENTS

| | | |
|---|---|---|
| GB | 2 347 744 A | 9/2000 |
| WO | WO 91/13373 | 9/1991 |

* cited by examiner

SEISMIC EXPLORATION AND IMAGING SYSTEM FOR PRODUCING SURVEY REPORTS OF SUBSEA GEOLOGICAL STRUCTURES

RELATED APPLICATION

This application claims priority to PCT Application No. PCT/GB2003/002823 filed Jun. 30, 2003, and Great Britain Application No. 0215214.8 filed Jul. 1, 2002.

TECHNICAL FIELD

The present invention relates to seismic exploration techniques and the seismic imaging of subsurface layers. It is particularly but not exclusively concerned with submarine seismic exploration and with producing seismic survey reports of subsea geological structures.

BACKGROUND OF THE INVENTION

Conventional seismic methods for exploring subterranean strata beneath the seabed involve generating a seismic wave and measuring the response. The seismic wave may be simple or complex and may be generated at sea level, beneath the surface of the water or at the seabed. The response is detected by a series of spaced receivers which are commonly positioned on cables towed behind an exploration vessel. Generally, the receivers are held stationary for the detection step and are then moved to a different location and the process is repeated.

The response to a seismic event in the solid rock at the sea floor includes a compression wave (P-wave) and a shear wave (S-wave). P-waves are considered well suited to imaging structures while the combination of S-waves is well suited to determining rock and fluid characteristics. P-waves travel through rock and sea water while S-waves travel through rock only. Thus, if the receivers are hydrophones floating at or beneath the surface, they will detect only the P-waves. In order to detect the S-waves, it is necessary to use geophones located at the seabed.

It has also been recognised that better seismic imaging can be achieved by making use of both P- and S-waves. However, the costs involved in positioning and re-positioning geophones on the sea bed in addition to the use of hydrophones has been found to be prohibitively costly. This is particularly so since in order to detect S-waves effectively, three independent orthogonal geophones are required at each recording location.

Specifically, it has been known for more than 10 years that 4C seismic imaging of the subsurface may add more and better information to exploration due to high quality recording of shear waves (S-waves) at the water bottom. Unfortunately, 4C-imaging did not become the success that was expected, primarily due to the combination of extreme high acquisition cost and uncertainties in the prediction of payback. The cost factor is related to capacity problems in available acquisition techniques.

4C recording is normally carried out by a hydrophone and three independent orthogonal geophones. The geophones are coupled to the sea bottom and they are therefore sensitive to the particle velocities generated by both the seismic p-waves and the s-waves. These techniques use either sensor cables at the sea bottom or geophone nodes resting on or planted in the sea bottom. 4C seismic acquisition consists of a sequence of moving source and moving receiver operations. After an independent source vessel has carried out a series of shooting profiles, the bottom equipment has to be moved into the next position. Both due to this static recording component in the acquisition and due to a limited number of available receivers, these 4C acquisition systems become ineffective. Due to physical problems both related to moving the heavy equipment along the water bottom and geophone coupling, the reliability is adversely affected.

Finally, it is also recognised that the cost effectiveness of carrying out such seismic imaging, and in particular S-wave measurements, could be greatly reduced by avoiding the need to locate detection apparatus at the seabed, that is to measure an S-wave from a position spaced from the seabed and so allow effective re-positioning of the detection apparatus with respect to the seabed. However, as mentioned, S-waves do not travel through sea water, making direct sensing remote from the seabed impossible. Remote sensing has further inherent problems in that the detection apparatus is subjected to ocean currents which can inhibit effective positioning of the detection apparatus, and introduce noise into measurements, making correlation of the results very difficult.

It is therefore an object of the invention to provide a method of seismic exploration in which both P-waves and S-waves are detected but which is simpler and less costly than known techniques.

SUMMARY OF THE INVENTION

According to one aspect of the invention, there is provided a method of seismic exploration which comprises: generating a seismic event; applying the seismic event to the earth's surface; detecting a response to the event, the detected response including P-waves and S-waves in the earth's surface; and analysing the detected response; and in which: the detecting step comprises monitoring and recording the response to the seismic event in the form of movements of particles at the earth's surface, from a position spaced from the earth's surface, the detecting step being carried out over a response period, the response period being a predetermined period of time after the seismic event; and the analysing step comprises analysing the movements of particles at the earth's surface in the recorded response to the seismic event during the response period.

According to another aspect of the invention, there is provided apparatus for carrying out seismic exploration which comprises: means for generating a seismic event; means for applying the seismic event to the earth's surface; detecting apparatus for detecting a response to the event including P-waves and S-waves in the earth's surface; and means for analysing the detected response; and in which: the detecting apparatus comprises monitoring apparatus and recording apparatus arranged to monitor and record the response to the seismic event in the form of movements of particles at the earth's surface, from a position spaced from the earth's surface, over a predetermined response period after the seismic event. The invention also extends to a method for the production of a seismic survey report, using the method and/or apparatus set out above, and also to a report produced in this way.

The particles at the surface will respond both to P-wave and S-wave stimulation and so their movements will be representative of the two waves. Since these movements are detected from a distance, the disadvantages of the prior art are avoided with there being no need to make contact with the surface and therefore no need to disengage before repositioning the detecting apparatus.

Preferably, the movements of the particles are monitored using light, in the form of visible light, x-rays, UV light or IR light, or using another form of radiation including radio waves, radar, sonar or using acoustic waves, in positioning principles from photogrammetry including interference measurements and acoustic positioning. The monitoring apparatus may be kept stationary during the response period and is then moved to a different position after the response period, and the method is then repeated. Alternatively, it may be moved relative to the earth's surface during the response period; the analysing step then preferably includes the elimination from the detected response of noise caused by the relative movement of the monitoring apparatus.

The monitoring apparatus preferably comprises several monitoring devices which are used simultaneously at different locations. Preferably, the response is transformed to and recorded in digital form. Preferably, the analysing step comprises analysing surface particle displacements and/or velocities and/or accelerations by measurements of changes in the distance (velocity) between a monitoring device such as a camera and the surface and the camera velocity. The camera velocity can be measured separately by three camera mounted accelerometers.

The z-component of the surface particle velocity is similar to the pressure component which will be measured with a mounted hydrophone on the monitoring device. This redundant measurement can be used to calibrate the system and make it more robust against ambient noise and system noise.

In a preferred embodiment, the monitoring apparatus comprises three sources of coherent mono frequency light directed at the surface area being monitored, and a receiver for the reflected coherent light beam. Preferably, the coherent light and a reference light beam are used to make speckle patterns by means of interferometry, and by monitoring the time variation in light intensity within a subset of speckles, the 3D-particle velocity in the surface can be calculated using interferometry principles.

With such measurements, the spatially and temporally coherent reference beam is scattered from the seabed and the seabed being a diffuse surface, produces a specular reflection. This specular reflection scattered from the seabed is the contribution of many scattered wavelets which have a constant relative phase determined by the optical path-length from each point on the seabed. Combining the reflected light with the coherent reference beam creates a complex interference pattern as a result of the difference in optical path length in reflections from the surface. An initial imaging processing step, where the interference pattern is subtracted from a known reference image, reveals the temporal progression of the 3-D particle displacement as a result of the seismic event. Furthermore, the signal to noise ratio may be improved by choosing multiple reference images to reduce speckle decorrelation effects. A final image processing step produces absolute intensity signal of the change in optical path as a result of said 3-D particle displacement. Finally, the intensity signal is then subjected to signal processing steps which recover the seismic S-wave signals in question.

Due to the relative movement between surface and the "camera", the speckle pattern seen by the light detector may change within the seismic time. When the camera is moving, the speckle pattern moves very fast and therefore the speckle monitoring must be carried out much more often than every 1 ms to be able to detect/recognise and therefore monitor the same speckle group every ms.

Due to the seismic wavelengths, the particle velocity may be in phase within a 5 m disc on the surface. Therefore groups of spatial distributed cameras can be used to increase signal to noise ratio in one seismic recording channel.

In one embodiment the monitoring apparatus comprises video recording apparatus. The video recording apparatus may include one or more cameras operating on the basis of visible light. By detecting the changing positions of selected surface objects in pictures taken with several cameras, the 3D-particle velocity can be calculated using standard photogrammetry principles.

Due to slower variation in these full field wave field measurements than in the speckle pattern picture, the time sampling rate can be lower, more in the order of the seismic time sampling (ms).

The invention is particularly suitable for marine seismics, in which the earth's surface is the sea bed, the seismic event is applied to the sea or directly to the sea bed and the monitoring apparatus is spaced above the sea bed. Preferably, the monitoring apparatus is located from 1 to 15 metres above the sea floor during the response period. The detecting apparatus may additionally include a hydrophone to record P-waves separately.

The detecting apparatus may be towed, eg. as a streamer or series of streamers behind a surface or submarine vessel. Thus, the detecting apparatus preferably comprises a plurality of monitoring devices mounted on a plurality of cables, the monitoring devices on each cable preferably being spaced from each other by a distance which is less than the wavelength of the transmitted seismic event to prevent spatial aliasing of the recorded wavefield. Alternatively, it may be located on a self-propelled submarine vessel. In such an arrangement, the vessel is preferably unmanned and would preferably include an rf transmitter/receiver and aerial, an acoustic modem, an acoustic housing sensor, a bottom sensor, a depth sensor and an acoustic tracking system, in addition to the monitoring apparatus. In either case, the analysing step should include the elimination from the detected response of noise representing disturbances caused by the motion of the detecting apparatus. This motion can be measured by three independent accelerometers and diameters and then subtracted from the relative motion measured by the camera.

Preferably, the particles whose movements are detected are sand particles on the sea floor.

Preferably, the seismic event comprises a seismic wave having a wavelength in the range 5 to 100 m and a duration from 2 ms to 1000 ms. Depending upon the depth of the exploration target and the seismic P and S-velocities, preferably, the response period is from 5 to 20 seconds. The seismic event may be generated using apparatus on a surface vessel. It may be generated at the surface or below the surface of the ocean. The event may be generated at the sea bed by seismic sources using the land seismic source principles, in which case P and S-waves can be generated.

The recording apparatus may be combined with the monitoring apparatus in a way similar to a video camera with a tape or other recording medium, but having three channels for stereo mapping and image analysis to recognize, detect and position image objects. Alternatively, the monitoring apparatus, eg. a camera, may have its output transmitted to a remote recording device, which may be on a surface vessel.

The detecting device is preferably moving during the transmission period at a speed in the range 1 to 5 m/s, more preferably 3 to 4 m/s. The sampling rate is preferably 1 to 2 ms. Thus, in the case of a camera, a picture would have to be made more often than the seismic sampling (ms) ie. <<1 ms eg. 1 μs to 0.1 ms and the effective number of pictures/second>100.

From each picture from the cameras a 3D velocity is extracted.

Clearly, since such a camera or an Ocean Bottom Movie Recorder (OBM) is moving in the water while recording, an unwanted dynamic component is added to the movie (towing noise). Parts of this noise can be separated from the recording by standard temporal and spatial filters. The noise which falls inside the frequency band of the particle velocity has to be calculated/predicted before it can be removed. The prediction of towing noise can be achieved using hydrophone measurements from single hydrophones attached to the camera, since these are proportional to the vertical particle velocity of the sea bottom detected, and by three accelerometers attached to the camera.

The relative movement in the OBM vessels/cables can also be partly predicted/eliminated by processing data from several recorders which at the same time, but from different places on the vessel/cable more or less record the same part of the wavefront. This can be achieved with a camera separation less than a wavelength of the seismic wave. If the resolution in the recording is good enough, relative positioning of the recorders can be derived by image analysis and the towing noise can be predicted as a result.

The OBM's may be towed in a similar geometry as the marine multi-streamer spread used for pure P-wave seismic acquisition, but at a depth as close as possible to the sea bottom.

The invention may be carried into practice in various ways and some embodiments will now be described with reference to the accompanying drawings.

DETAILED DESCRIPTION OF THE INVENTION

Figure 1:
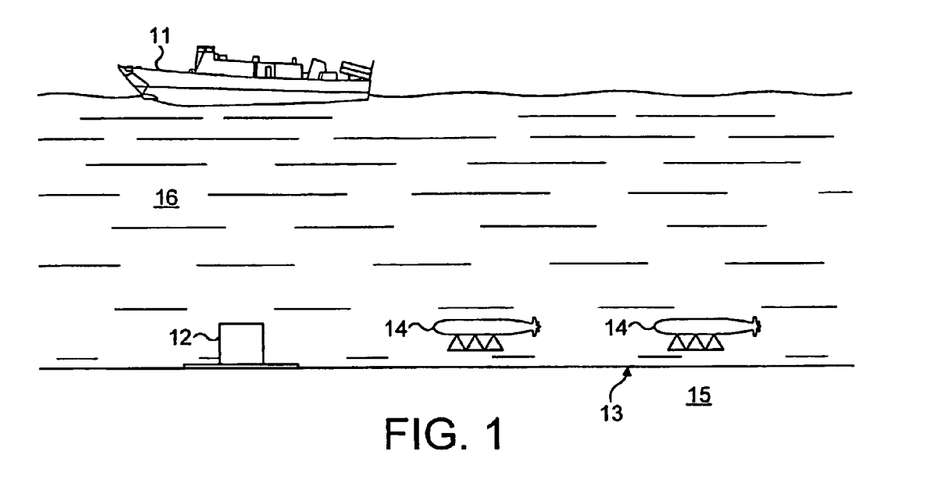
FIG. 1 is a schematic diagram of a system according to an embodiment of the present invention.

Referring to FIG. 1, the operation is controlled by a surface vessel 11. A seismic source 12 is located on the seabed 13 and a series of mobile camera units 14 (of which two are shown) monitor the response at the seabed 13 to a seismic wave generated by the source 12. The camera units 14 are positioned about a metre above the seabed 13.

The camera units 14 each include a light transmitter, a receiver, a hydrophone, an accelerometer and a processing unit. The transmitter transmits light in the form of expanding rays, concentrated rays, modulated light and/or three independent rays. The receiver may comprise a full field array, a coupled array or a single detector.

The hydrophone is present to measure seismic P-waves above the sea bottom 13. The accelerometer measures camera oscillations in the 0-200 Hz range. The processing unit serves to filter noise (camera oscillations) from the measurements taken, to recognise and detect image objects, to measure image object values and convert those values to particle velocities.

In use, the source 12 generates a seismic wave with a response which lasts for a period of 5 to 20 seconds which propagates through the bedrock 15 as P- and S-waves. The initial seismic wave is reflected and/or refracted at various stratum boundaries and the returning P- and S-waves cause oscillations in the up to 200 Hz range at the sea bottom 13 whose surface includes mud, sand and rocks. The camera units 14 monitor the response at the sea bottom 13 by applying light to the bottom 13 and recording the reflected light (ie. the cameras 14 film the bottom 13) at a sampling rate of 0.000001 to 4 ms but generally <1 ms. In effect, this constitutes a movie of the particles on the sea bottom 13 as they move in response to the returning P- and S-waves.

The returning P-wave also progresses from the seabed 13 up through the water 16 and is detected by the hydrophone, at a sampling rate of 1 to 4 ms and this data is conveyed to the processing unit. The accelerometer conveys noise data corresponding to camera oscillations to the processing unit.

The processing unit analyses the data collected from the receiver, the hydrophone and the accelerometer and produces a record of the response of the sea bottom particles, compensated for movement of the camera. This record can then be analysed using standard principles for seismic processing interpretation and characterisation of structures, stratigrapic features and rock and fluid parameters.

Thus for each seismic shot from the source 12, all camera units 14 simultaneously record the wavefield response at the sea bottom 13 in 2 to 4 ms movie samples. The camera units 14 carry out a preprocessing step which includes noise reduction, resolution enhancement, and image object identification. The camera unit dynamics are calculated and removed from the movies. Then $V_x$, $V_y$ and $V_z$ (the three velocity components of the S-wave) and P (the pressure from the P-wave) are derived and stored on four seismic traces. This is repeated each 2 to 4 ms.

In an alternative embodiment, the seismic source is not at a fixed location on the seabed, but is in fact a moving P-wave source which may for example be located on the vessel 11. The P-wave generated travels through the water 16 and into the bedrock 15 where it propagates and is reflected/refracted as P- and S-waves as before.

Figure 2:
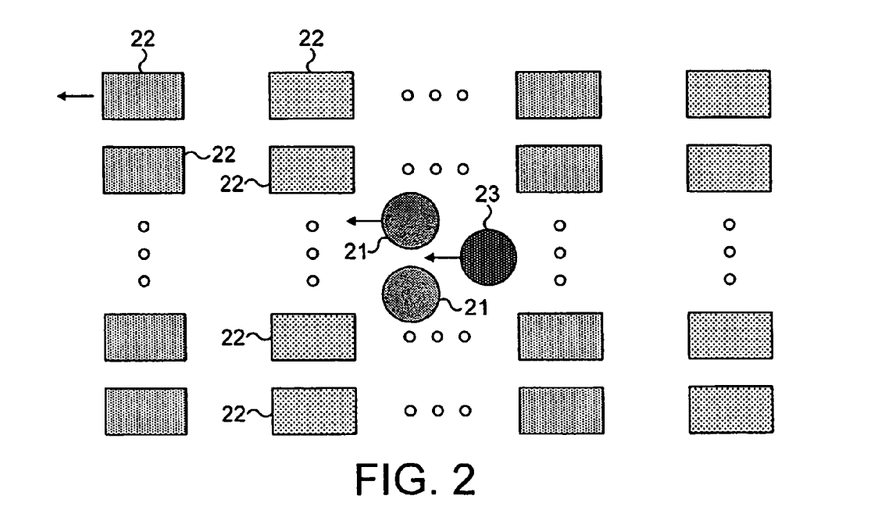
FIGS. 2, 3 and 4 are schematic plan views of three different data acquisition schemes according to various embodiments of the present invention.

FIG. 2 shows an arrangement in which the seismic source 21 is moving, and which includes an array of camera units 22 which is moving and also a seismic receiver 23 which is moving. Four cameras are shown in each array though there could be a greater number. An ideal arrangement would include 1 to 3 sources at a spacing of 50 to 400 m. The seismic receiver 23 is spaced from the sources also by a distance of 25 to 400 m and records for 5 to 20 seconds (depending on the transmission period) at a sampling rate of 1 to 4 ms. The camera units 22 and seismic receiver 23 move at a speed of 1 to 5 ms. The bottom source is fixed while the floating, towed source is moving. The seismic receiver is the centre where all measurements are stored, where the steering is controlled, where energy can be distributed from, and where the operators are housed. This is similar to a seismic vessel which tows a seismic source and receivers today, and which would record/store the seismic information.

Figure 3:
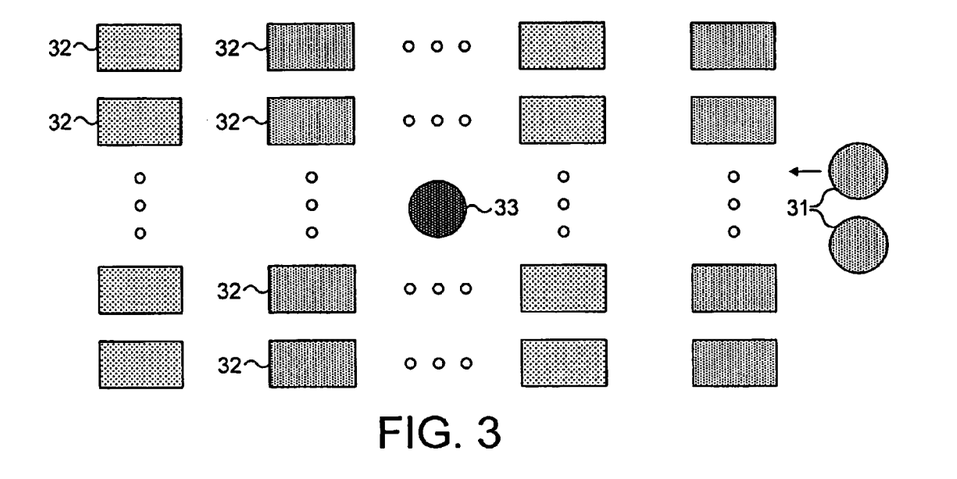

FIG. 3 shows an alternative arrangement in which the sources 31, optimally 1 to 3 in number, are moveable at a speed of 1 to 5 ms, while the camera units 32 and seismic receivers 33 are fixed. The spacings are similar to those in the previous arrangement.

Figure 4:
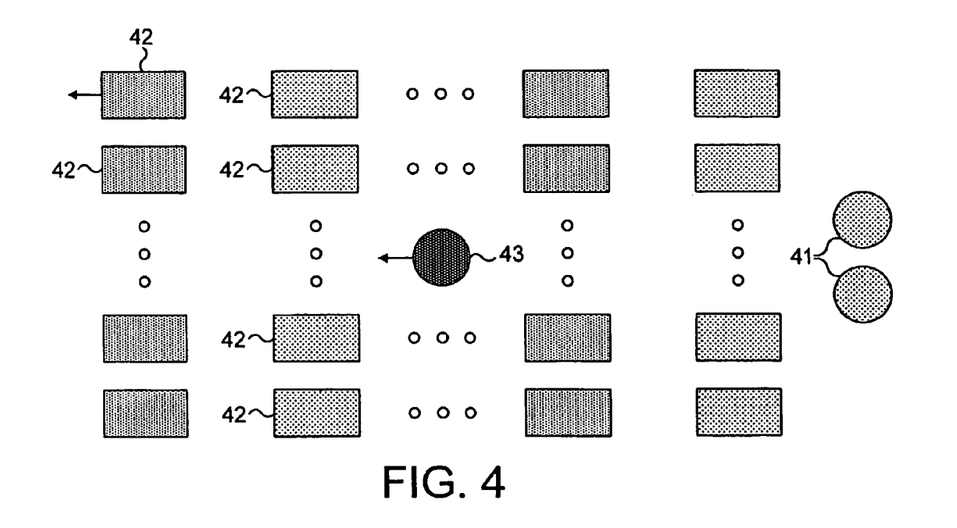
Figure 5:
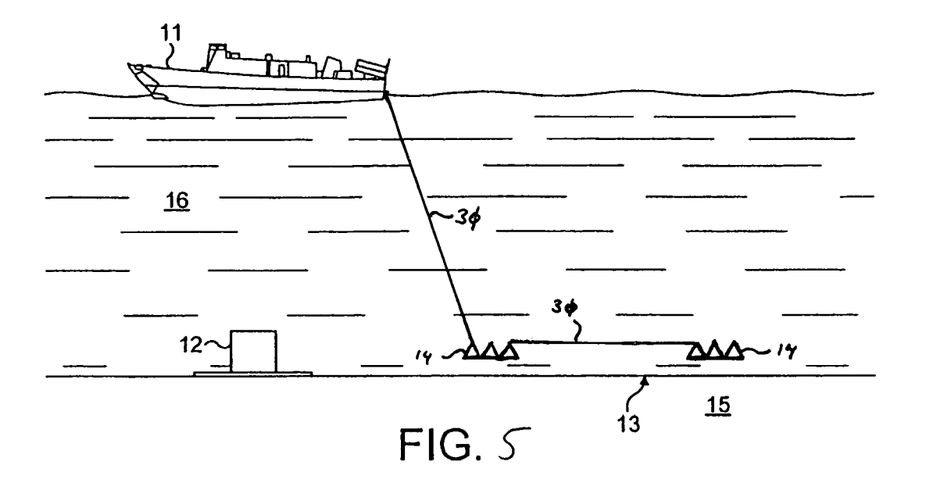
FIG. 5 is a schematic diagram of a system according to an embodiment of the present invention.

FIG. 4 shows a third arrangement, corresponding to FIG. 1, in which the sources 41 (again optimally 1 to 3 in number) are fixed, while the camera units 42 and the seismic receiver 43 are moveable. The spacings and speeds are as for the first arrangement.

The camera units would normally be mounted on or connected to cables 30 which are towed behind a vessel or by a dedicated submarine propulsion device. The position of the cameras relative to the seabed is determined by acoustic techniques and the cables 30 are steered by "wings" on the cables 30. Vertical forces on the cables 30 are balanced by weights or ballast. The cables 30 provide mechanical connection between an array of camera units and also provide energy and communication convections. In a typical arrangement there are several cables 30 each towing an array of camera units.

The vessel or towing device includes navigation equipment and data storage, through the camera units also have data storage.

Alternatively, the connection between the camera units may be wireless eg. a radio connection either instead of or in addition to the cables 30.

The invention claimed is:

1. A method of seismic exploration comprising:
   generating a seismic event;
   applying the seismic event to a body of water having a sea bottom;
   detecting a response to the seismic event within a detection area of the sea bottom from a position spaced apart from the sea bottom, the response including P-waves and S-waves resulting from the seismic event; and
   analyzing the response;
   wherein:
   detecting the response includes monitoring successively each of a plurality of non-discrete, overlapping segments defining the detection area to ascertain in the detection area over a response period and recording a detected response to the seismic event, the response period being a predetermined period of time after the seismic event;
   analyzing the response includes analyzing the movements of the particles in the detection area of the sea bottom ascertained during the response period; and
   monitoring includes using a monitoring apparatus which is moved relative to the sea bottom during the response period.

2. The method of claim 1, wherein monitoring further includes applying successively to each of the plurality non-discrete, overlapping segments defining the detection area light, in the form of visible light, x-rays, UV light or IR light, or another form of radiation including radio waves, radar, sonar or acoustic waves.

3. The method of claim 2, wherein using the monitoring apparatus includes directing a source of coherent mono frequency light at the detection area and receiving reflected coherent light.

4. The method of claim 3, wherein monitoring further includes using the coherent light and a reference beam to make speckle patterns by means of interferometry and analyzing further includes analyzing the speckle patterns.

5. The method of claim 2, wherein using the monitoring apparatus further includes using a video recording apparatus.

6. The method of claim 5, wherein using the video recording apparatus includes using one or more cameras operating on a basis of visible light.

7. An apparatus for carrying out seismic exploration comprising:
   means for generating a seismic event;
   means for applying the seismic event to a body of water having a sea bottom;
   a detecting apparatus configured to detect within a detection area of the sea bottom a response to the seismic event, the response including P-waves and S-waves in the sea bottom resulting from the seismic event, the detecting apparatus being spaced apart from the sea bottom; and
   means for analyzing the detected response; wherein:
   the detecting apparatus includes a monitoring apparatus configured to monitor successively each of a plurality of non-discrete, overlapping segments defining the detection area to ascertain movements of particles in the detection area over a response period and recording apparatus configured to record a detected response to the seismic event, the response period being a predetermined response period after the seismic event; and
   the monitoring apparatus is configured to move relative to the sea bottom during the response period.

8. The method of claim 1, wherein analyzing further includes eliminating from the detected response noise caused by movement of the monitoring apparatus in relation to the sea bottom.

9. The method of claim 1, wherein using a monitoring apparatus includes the step of using a plurality of monitoring devices simultaneously at different locations.

10. The method of claim 1, wherein detecting the response further includes:
    transforming the response into digital form; and
    recording the response in digital form.

11. The method of claim 1, wherein analyzing further includes analyzing surface particle displacements, velocities, or accelerations.

12. The method of claim 1, wherein applying the seismic event includes applying the seismic event directly to the sea bottom.

13. The method of claim 12, wherein using the monitoring apparatus includes locating the monitoring apparatus between approximately 0.5 to 5 meters above the sea bottom during the response period.

14. The method of claim 12, wherein using the monitoring apparatus includes using a hydrophone.

15. The method of claim 12, wherein analyzing includes eliminating noise representing disturbances caused by the motion of the monitoring apparatus from the detected response, the monitoring apparatus being towed or self-propelled.

16. The method of claim 12, wherein monitoring successively each of the plurality of non-discrete, overlapping segments defining the detection area to ascertain the movements of the particles includes monitoring successively each of the plurality of non-discrete, overlapping segments defining the detection area to ascertain the movements of sand particles on the sea bottom.

17. The method of claim 12, wherein generating the seismic event includes generating a seismic wave having a wavelength in a range of approximately 5 to 100 meters and a duration of up to approximately 3 seconds.

18. The method of claim 12, wherein monitoring over a response period includes monitoring in a range of approximately 4 to 8 seconds.

19. The method of claim 12, wherein monitoring using the monitoring apparatus includes monitoring using a plurality of monitoring devices mounted on a plurality of cables, the monitoring devices on each cable being spaced from each other by a distance which is less than the wavelength of the transmitted seismic event.

20. The method of claim 1, wherein analyzing includes deriving representations of subsurface layers and assembling the representatives as a depiction of a geological structure of the region.

21. An apparatus for carrying out seismic exploration comprising:
    a seismic event generator;
    a seismic delivery device configured to apply the seismic event to a body of water having a sea bottom;

a detecting apparatus configured to detect within a detection area of the sea bottom a response to the seismic event, the response including P-waves and S-waves resulting from the seismic event, the detecting apparatus being spaced apart from the sea bottom; and
an analyzer;
wherein:
the detecting apparatus includes a monitoring apparatus configured to monitor successively each of a plurality of non-discrete, overlapping segments defining the detection area to ascertain movements of particles in the detection area, over a response period and a recording apparatus configured to record a detected response to the seismic event, the response period being a predetermined response period after the seismic event; and
the monitoring apparatus is configured to move relative to the sea bottom during the response period.

22. The apparatus of claim 21, wherein the monitoring apparatus is configured to apply to the detection area light, in the form of visible light, x-rays, UV light or IR light or another form of radiation including radio waves, radar, sonar or acoustic waves.

23. The apparatus of claim 21, wherein the monitoring apparatus is capable of being kept stationary during the response period and then moved to a different position after the response period.

24. The apparatus of claim 21, wherein the monitoring apparatus includes several monitoring devices which can be used simultaneously at different locations.

25. The apparatus of claim 21, wherein the monitoring apparatus includes a source of coherent light arranged to be directed at the detection area and a receiver for reflected coherent light.

26. The apparatus of claim 21, wherein the monitoring apparatus includes a video recording apparatus and the recording apparatus is configured to record a visual record.

27. The apparatus of claim 21, wherein the seismic delivery device is configured to apply the seismic event directly to the sea bottom.

28. The apparatus of claim 27, wherein the detecting apparatus additionally includes a hydrophone.

29. The apparatus of claim 27, wherein the detecting apparatus is configured to be towed by a vessel or is self-propelled.

30. The apparatus of claim 21, wherein the detecting apparatus includes a plurality of monitoring devices mounted on a plurality of cables, the monitoring devices on each cable being spaced from each other by a distance which is less than the wavelength of the transmitted seismic event.

31. The method of claim 2, wherein monitoring successively further comprises recording successively reflected light in the form of visible light, x-rays, UV light or IR light or another form of radiation including radio waves, radar, sonar or acoustic waves from each of the plurality of non-discrete, overlapping segments defining the detection area.

* * * * *

UNITED STATES PATENT AND TRADEMARK OFFICE
CERTIFICATE OF CORRECTION

PATENT NO. : 7,660,188 B2  Page 1 of 1
APPLICATION NO. : 10/519882
DATED : February 9, 2010
INVENTOR(S) : Meldahl It is certified that error appears in the above-identified patent and that said Letters Patent is hereby corrected as shown below:

Title Pg. (*) Notice:
Delete "42 days" and insert --180 days--.

Column 7, Line 3:
Delete "convections" and insert --connections--.

Column 7, Line 7:
Delete "through" and insert --though--.

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,660,188 B2 Page 1 of 1
APPLICATION NO. : 10/519882
DATED : February 9, 2010
INVENTOR(S) : Paul Meldahl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 189 days.

Signed and Sealed this

Twenty-eighth Day of December, 2010

David J. Kappos
*Director of the United States Patent and Trademark Office*